J. M. KERN.
STUFFING BOX.
APPLICATION FILED MAY 22, 1918.
1,304,690.
Patented May 27, 1919.
2 SHEETS—SHEET 2.
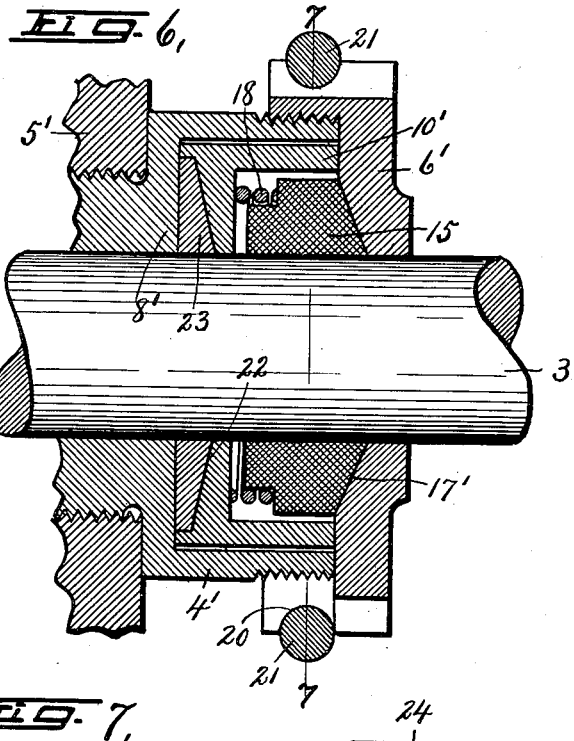
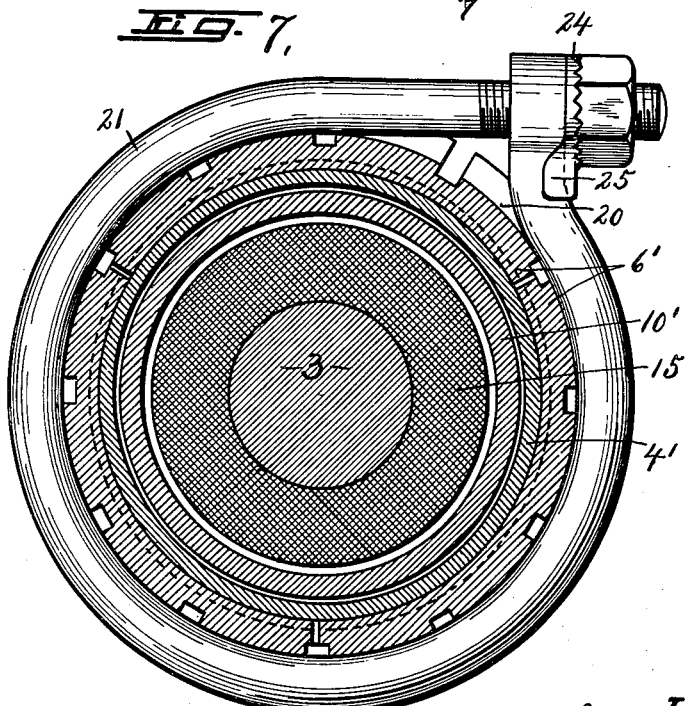
INVENTOR
J. M. Kern
BY
Howard P. Denison
ATTORNEY

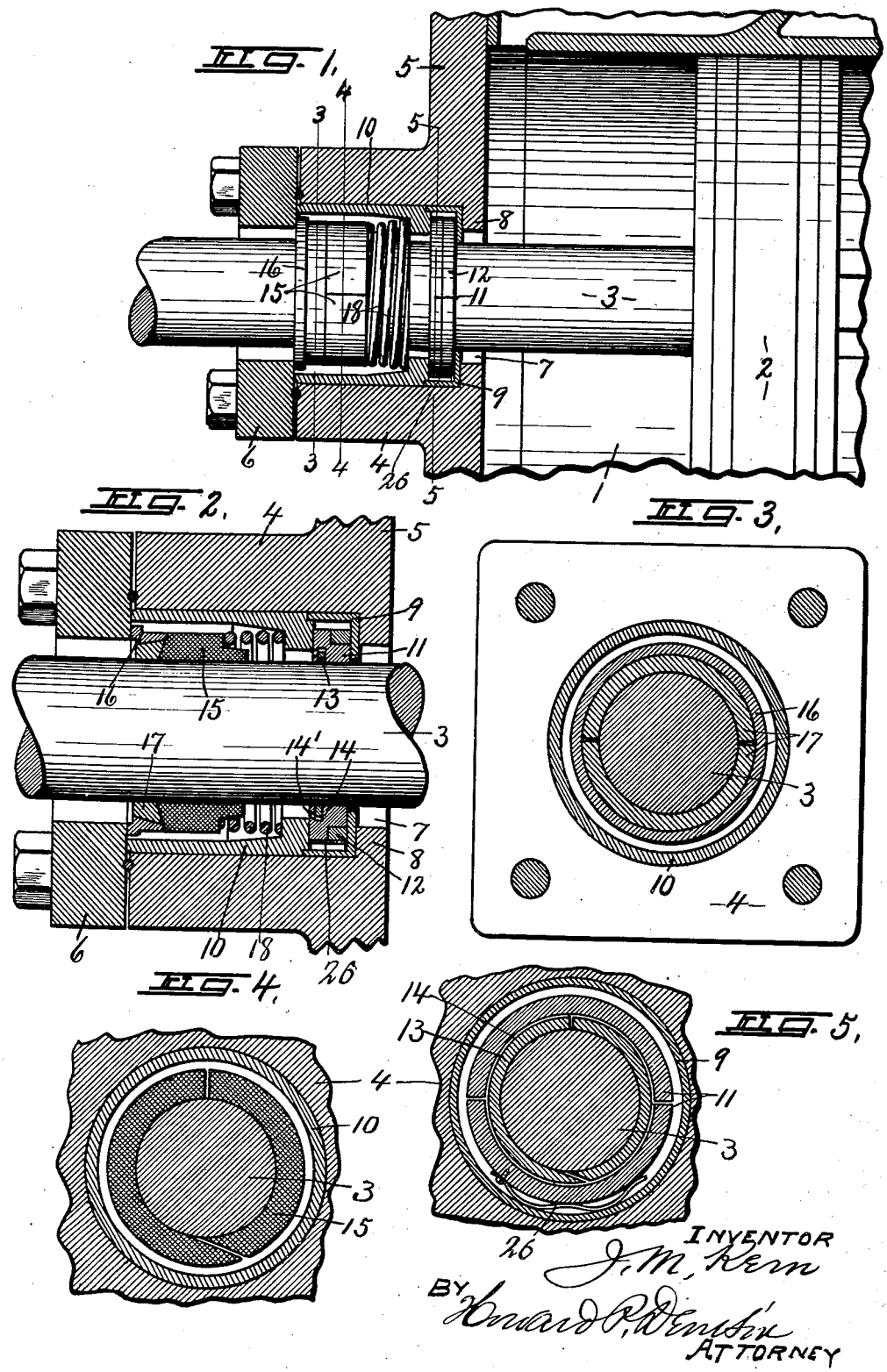

UNITED STATES PATENT OFFICE.

JOSEPH M. KERN, OF OSWEGO, NEW YORK.

STUFFING-BOX.

1,304,690.     Specification of Letters Patent.     Patented May 27, 1919.

Application filed May 22, 1918. Serial No. 235,944.

*To all whom it may concern:*

Be it known that I, JOSEPH M. KERN, a citizen of the United States of America, and resident of Oswego, in the county of Oswego, in the State of New York, have invented new and useful Improvements in Stuffing-Boxes, of which the following, taken in connection with the accompanying drawings, is a full, clear, and exact description.

This invention relates to certain improvements in stuffing boxes for reciprocating piston rods as used more particularly in the cylinders of steam locomotives and other high pressure engines or pumps.

These stuffing boxes are usually provided with split packing rings of suitable metal having wedging ends spring pressed together toward the gland so as to compress the main packing ring upon the rod to prevent leakage of steam from the cylinder.

I have found however, that, after a short period of use, these packing rings and particularly the wedging ends thereof become battered and worn to such an extent as to not only destroy their efficiency by allowing the steam to escape therethrough to the atmosphere but also to mutilate the piston rod, thus necessitating frequent replacement of the rings and truing up of the rods.

Furthermore this excessive escape of steam around and usually in advance of the locomotive frequently obscures the vision of danger and other signals resulting in more or less serious accidents and loss of power which might otherwise be avoided.

These objectionable results are due largely to the fact that the high steam pressure in the adjacent end of the cylinder is allowed to exert its force upon the inner end of the main packing ring in the same direction as that of the spring and produces excessive friction between the ring and rod during the inward stroke of the piston while, during the outward stroke, when the high pressure steam is practically cut off, the friction between the rod and ring is reduced to approximately that produced by the spring alone.

The main object of my invention is to obviate this excessive friction and wear and to materially increase the life and efficiency of stuffing boxes of this character by preventing the passage of the high pressure steam to the packing rings.

Other objects and uses relating to specific parts of the stuffing box will be brought out in the following description.

In the drawings—

Figure —1— is a longitudinal sectional view of one form of my improved stuffing box and adjacent end of a steam cylinder of which it forms a part, the packing rings being shown in elevation.

Fig. —2— is a longitudinal sectional view of the same stuffing box through the packing rings.

Figs. —3—, —4—, and —5— are transverse sectional views taken respectively on lines 3—3, 4—4, and 5—5, Fig. —1—.

Fig. —6— is a longitudinal sectional view of a slightly modified form of stuffing box.

Fig. —7— is a transverse sectional view taken in the plane of lines 7—7, Fig. —6—.

As illustrated in Figs. —1— to —5— inclusive, the stuffing box forms a part of a locomotive steam cylinder —1— having a reciprocatory piston —2— and rod —3— therefor and comprises a tubular boss —4— on the head as —5— of the cylinder, and a gland plate or follower —6— bolted to the outer end of said boss and having the usual opening —7— through which the rod —3— reciprocates.

The portion of the head —5— at the inner end of the boss is provided with an annular shoulder —8— surrounding the rod —3— and forming an abutment for one end of an angle ring or collar —9—. The opposite end of said sleeve abuts against the inner end of a tubular sleeve or bushing —10— which fits closely, but removably, within the boss —4— and abuts at its outer end against the inner face of the gland plate —6—, so that the two members —9— and —10— are normally held end to end against each other and against the members —6— and —8— to prevent their endwise movement.

The inner edge of the sleeve —9— surrounds the periphery of the rod —3— and forms a steam abutment at the inner end of the box to receive and resist the direct thrust of the steam from the cylinder.

A collar —11— is fitted upon the rod —3— to allow the latter to slide freely therethrough and is preferably divided diametrically into opposite half sections to allow it to compensate for wear by the rod, the sections being held together by a solid ring —12— which is seated in an annular recess in the periphery thereof as shown in Fig. —2—.

A split packing ring —13— is fitted in an annular groove —14— in the inner face of the sectional collar —11— and together with said collar and the sleeve —9— serve to additionally prevent the passage of steam from the cylinder into the stuffing box.

In case there should be any tendency to expand the ring —13— by steam passing along the rod —3— to the outer face of the ring, it may be easily prevented by providing the ring with one or more small holes —14'— leading from its outer end face to its periphery so as to instantly produce the same steam pressure at the periphery and thereby restore it to its most efficient packing position for preventing the action of the high pressure steam upon the main packing ring as —15—.

This main packing ring —15— is inclosed within bushing —10— but apart therefrom and is fitted upon the rod —3— to allow the latter to slide freely therethrough, it being split or divided into sections to allow it to compensate for wear.

The outer end face of the ring —15— is preferably conical for wedging engagement with the adjacent ends of a solid ring —16— and a split packing ring —17—, the ring —15— being constantly forced into engagement with the members —16— and —17— by a coil spring —18— which surrounds the rod —3— and has its opposite end bearing against suitable shoulders on said ring and bushing —10— respectively as shown in Fig. —2—.

The periphery of the member —17— and inner face of the member —16— are similarly tapered toward the outer end of the box and fit closely one upon the other, the ring —16— abutting against the inner face of the gland plate —6— to prevent its outward displacement and to render the action of the packings —15— and —17— more effective in further preventing the escape of steam from the cylinder outwardly through the box, it being understood that both rings —15— and —17— are compressed upon the rod —3— by the same end thrust pressure of the spring —18— coacting with the collar —16—.

In Figs. —6— and —7— I have shown a modified form of stuffing box in which a tubular boss —4'— is screwed into the end head —5'— of the cylinder, the outer end of said boss being threaded externally and engaged by a split or sectional gland-plate or screw cap follower —6'— having an annular peripheral groove —20— for receiving a clamping ring —21— by which the cap —6'— may be tightened on the boss —4'— to frictionally hold said cap against loosening.

This cap takes the place of the gland-plate —6— and rings —16— and —17— and is provided with a concave seat —17'— for the adjacent tapered end of the wedge-ring —15—, which is spring pressed against said seat to tighten said wedge-ring upon the piston rod —3— and thereby reduce the liability of leakage at this joint.

The inner end face of the bushing as —10'— is also provided with a concave seat —22— for the adjacent tapered end of a split or sectional packing ring —23— which abuts against the inner end wall as —8'— of the boss —4'— so that the end thrust of the bushing —10'— by the cap 6' or spring —18— causes the compression of the packing ring —23— upon the periphery of the rod —3— to prevent the passage of the high pressure steam to the main packing ring —15'—.

The ends of the clamping ring —21— are approximately tangential to the periphery of the cap or gland plate —6'— and at right angles to each other, one of said ends being threaded and passed through an aperture in the other end and provided with a nut for tightening purposes.

A lock plate or washer —24— is interposed between the nut and apertured end of the clamping ring and is provided with suitable lips —25— for engaging opposite sides of the adjacent portion of said ring to hold it against turning, the adjacent faces of the nut and washer being serrated to hold the nut against turning when tightened.

If desired the weight of the sectional ring —11— may be partially supported by a light spring —26— resting on the lower side of the angle ring —9— as shown in Figs. —2— and —5— so as to reduce the wear upon the rings —11— and —13— and rod —3— and allow the ring —13— to perform its function more freely and efficiently.

What I claim is:

1. A stuffing box for the piston rods of steam cylinders comprising a tubular boss on the head of the cylinder, a sleeve fitted within the boss and provided with an inner annular flange, means including a gland-plate for holding the sleeve against endwise movement, a split packing ring upon the piston rod abutting against the inner end face of said flange, an additional split packing ring within said sleeve between said flange and gland plate and spring pressed toward the gland plate, and means for compressing the second named ring upon the piston rod under pressure of the spring.

2. A stuffing box for the piston rods of steam cylinders comprising a tubular boss on the head of the cylinder, a sleeve fitted within the boss and provided with an inner annular flange, means including a gland-plate for holding the sleeve against endwise movement, a solid packing ring abutting endwise against said gland-plate and provided with an outwardly-tapered bore, an outwardly-tapered split ring fitted within said bore and provided with a concave inner end face, an additional split packing ring having a convex outer end face abutting against said concave face, and a spring interposed between said flange and the second named split ring for holding the convex and concave end faces of both split rings in contact.

In witness whereof I have hereunto set my hand this 11th day of May, 1918.

JOSEPH M. KERN.

Witnesses:
 M. J. WALTER,
 ALICE WALTER.